United States Patent
Kim et al.

(10) Patent No.: US 10,005,414 B2
(45) Date of Patent: Jun. 26, 2018

(54) METHOD FOR INTEGRATEDLY OPERATING ACTIVE AND MANUAL SAFETY DEVICES

(71) Applicants: HYUNDAI MOTOR COMPANY, Seoul (KR); KIA MOTORS CORPORATION, Seoul (KR)

(72) Inventors: Eung Seo Kim, Suwon-si (KR); Tae Young Lee, Yongin-si (KR); Yong Seok Kwon, Suwon-si (KR); Sang Min Lee, Seoul (KR); Suk Ki Min, Suwon-si (KR); Dong Hyun Sung, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days. days.

(21) Appl. No.: 15/367,976

(22) Filed: Dec. 2, 2016

(65) Prior Publication Data

US 2017/0361796 A1    Dec. 21, 2017

(30) Foreign Application Priority Data

Jun. 16, 2016 (KR) .................. 10-2016-0075245

(51) Int. Cl.
  *B60R 21/0134* (2006.01)
  *B60R 21/015* (2006.01)
  (Continued)

(52) U.S. Cl.
  CPC ...... *B60R 21/0134* (2013.01); *B60K 31/0008* (2013.01); *B60R 21/01534* (2014.10);
  (Continued)

(58) Field of Classification Search
  CPC .......... B60R 21/0134; B60R 21/01544; B60R 2021/01211; B60R 2021/01265;
  (Continued)

(56) References Cited

U.S. PATENT DOCUMENTS 5,278,764 A * 1/1994 Iizuka .................. B60T 13/662
                                                              180/170
7,828,104 B2 * 11/2010 Akaba .................. B60R 21/013
                                                              180/268
(Continued)

FOREIGN PATENT DOCUMENTS

JP    10-338111    * 12/1998
JP    2004-243888 A    9/2004
(Continued)

OTHER PUBLICATIONS

Korean Office Action dated Apr. 3, 2017, issued in Korean Patent Application No. 10-2016-0075245.
(Continued)

*Primary Examiner* — Michael J Zanelli
(74) *Attorney, Agent, or Firm* — McDermott Will & Emery LLP

(57) ABSTRACT

A method for controlling operations of safety devices of a vehicle includes determining whether there is a possibility of a collision with a preceding vehicle on the basis of vehicle driving information, determining occupancy information of a passenger or a type of a passenger or determining whether a passenger has fastened a seat belt using vehicle sensor information, and determining whether to apply, and applying accordingly, full braking, a full braking profile, or an airbag deployment scheme according to the occupancy information of a passenger, the type of the passenger, or whether the passenger has fastened a seat belt when a possibility of a collision is determined, and fully retracting the passenger's
(Continued)

seat belt before full braking is applied after partial braking is applied.

16 Claims, 6 Drawing Sheets

(51) Int. Cl.
  *B60R 21/01* (2006.01)
  *B60W 10/184* (2012.01)
  *B60W 10/30* (2006.01)
  *B60W 30/095* (2012.01)
  *B60W 50/00* (2006.01)
  *B60K 31/00* (2006.01)

(52) U.S. Cl.
  CPC ...... *B60R 21/01544* (2014.10); *B60W 10/184* (2013.01); *B60W 10/30* (2013.01); *B60W 30/095* (2013.01); *B60W 50/0098* (2013.01); *B60R 2021/01211* (2013.01); *B60R 2021/01259* (2013.01); *B60R 2021/01265* (2013.01); *B60R 2021/01272* (2013.01); *B60W 2420/52* (2013.01); *B60W 2550/10* (2013.01); *B60W 2710/182* (2013.01); *B60W 2710/30* (2013.01)

(58) Field of Classification Search
  CPC ...... B60R 2021/01259; B60W 50/008; B60W 30/095; B60W 10/30; B60W 10/184; B60W 2710/182; B60W 2710/30; B60W 2550/10; B60W 2420/52
  See application file for complete search history.

(56) References Cited

U.S. PATENT DOCUMENTS

| | | | | |
|---|---|---|---|---|
| 2004/0045757 A1* | 3/2004 | Midorikawa | ........... | B60R 21/01 180/268 |
| 2005/0288829 A1* | 12/2005 | Sakai | ................. | B60R 21/0152 701/1 |
| 2007/0228705 A1* | 10/2007 | Rao | ..................... | B60R 21/0134 280/735 |
| 2009/0210114 A1* | 8/2009 | Baumann | ........... | B60R 21/0132 701/45 |
| 2014/0142830 A1 | 5/2014 | Bemzen et al. | | |

FOREIGN PATENT DOCUMENTS

| | | | |
|---|---|---|---|
| JP | 2005-41468 | * | 2/2005 |
| JP | 2012-232619 | A | 11/2012 |
| JP | 2014-520025 | A | 8/2014 |
| KR | 10-0337824 | B1 | 5/2002 |
| KR | 10-2006-0039491 | A | 5/2006 |
| KR | 10-2009-0116307 | A | 11/2009 |
| KR | 101500162 | B1 | 3/2015 |
| KR | 10-1511862 | B1 | 4/2015 |

OTHER PUBLICATIONS

Office Action issued in corresponding Korean Patent Application No. 10-2016-0075245, dated Jun. 7, 2017.

* cited by examiner

| | CLASSIFICATION | | WHETHER TO APPLY AEB FULL BRAKING | AEB FULL BRAKING PROFILE | DAB | PAB | PAB OPENS VENT HOLE |
|---|---|---|---|---|---|---|---|
| DRIVER'S SEAT | 5% OR LESS | BELT FASTENED | ○ | STEP OR VARIABLE | HIGH/LOW PRESSURE | | |
| | 50% OR GREATER | BELT FASTENED | ○ | STEP OR VARIABLE | HIGH/LOW PRESSURE | | |
| | 5% OR LESS | BELT NOT FASTENED | ○ | STEP OR VARIABLE | HIGH/LOW PRESSURE | | |
| | 50% OR GREATER | BELT NOT FASTENED | ○ | STEP OR VARIABLE | HIGH/LOW PRESSURE | | |
| | NOT SEATED | | ○ | STEP OR VARIABLE | HIGH/LOW PRESSURE | | |
| PASSENGER SEAT | 5% OR LESS | BELT FASTENED | ○ | STEP OR VARIABLE | | HIGH/LOW PRESSURE | INITIAL/NORMAL/ DELAY OPEN |
| | 50% OR GREATER | BELT FASTENED | ○ | STEP OR VARIABLE | | HIGH/LOW PRESSURE | INITIAL/NORMAL/ DELAY OPEN |
| | 5% OR LESS | BELT NOT FASTENED | ○ | STEP OR VARIABLE | | HIGH/LOW PRESSURE | INITIAL/NORMAL/ DELAY OPEN |
| | 50% OR GREATER | BELT NOT FASTENED | × | — | | HIGH/LOW PRESSURE | INITIAL/NORMAL/ DELAY OPEN |
| | CRS | | ○ | STEP OR VARIABLE | | — | — |

FIG. 4

METHOD FOR INTEGRATEDLY OPERATING ACTIVE AND MANUAL SAFETY DEVICES

CROSS-REFERENCE TO RELATED APPLICATION

This application claims the benefit of priority to Korean Patent Application No. 10-2016-0075245, filed on Jun. 16, 2016, in the Korean Intellectual Property Office, the disclosure of which is incorporated herein in its entirety by reference.

TECHNICAL FIELD

The present disclosure relates to a method for operating a safety device, and more particularly, to a method for operating a safety device to reduce injury to a vehicle occupant by integratedly, contingently or concurrently operating an active safety device and a manual safety device.

BACKGROUND

As vehicle safety technologies have advanced, installation of active safety devices capable of avoiding a collision or reducing a collision rate, such as autonomous emergency braking (AEB), from existing manual safety devices for reducing injury to an occupant such as a seat belt, an airbag, and the like, has expanded. An AEB, a typical active safety device, is presently evaluated or is to be evaluated in safety in international organizations such as EuroNCAP, US NCAP, IIHS, and the like, and evaluation and development thereof is expected to be further performed in the future. However, installation of both the existing manual safety device and the active safety device may increase a possibility of injury due to simultaneous airbag deployment along with an occupant behavior (e.g., out of position (OOP)) according to an operation of the AEB in the event of a collision.

For example, regarding an injury mechanism due to an airbag hitting at the time of an operation of an AEB, when an AEB of a corresponding vehicle operates, 0.8 to 1G of acceleration is generated (G is gravitational acceleration equal to earth's gravitation) and causes vehicle pitching and occupant motion before a collision. When the corresponding collision occurs, injury to a head, a neck and the like, may be increased due to direct contact by the airbag or an occupant motion or behavior.

That is, in an operation of existing safety devices including both manual safety devices and active safety devices, only their respective functions are implemented and a process of optimizing a total vehicle system against a possibility of an injury due to airbag deployment and an occupant behavior or motion according to an operation of the AEB in the event of a collision is insufficient. In the related art, the AEB operates even when a seat belt is not worn or operates regardless of the presence of an occupant or an occupant type sensed by an occupant detection system (ODS). Further, an airbag (a driver airbag (DAB) or a passenger airbag (PAB)) operates regardless of whether the AEB operates, which may increase the possibility of injury to an occupant. Since a pre-safety seat belt (PSB) operates after a vehicle is rapidly controlled and braked, an injury potential may be increased due to an increase in the occupant behavior or motions.

SUMMARY

The present disclosure has been made to solve the above-mentioned problems occurring in the prior art while advantages achieved by the prior art are maintained intact.

An aspect of the present disclosure provides a method for operating a safety device to optimize operational conditions of an autonomous emergency braking (AEB), an airbag (a DAB, a PAB, etc.), a seat belt, a pre-safety seat belt (PSB), and the like, to interwork with an airbag control unit (ACU) such that a passenger behavior is minimized to reduce an injury to a passenger in a vehicle in which active and manual safety devices are installed together.

According to exemplary embodiments of the present disclosure, a method for controlling operations of safety devices of a vehicle includes: determining whether there is a possibility of a collision with a preceding vehicle on the basis of vehicle driving information; determining occupancy information of a passenger or a type of a passenger or determining whether a passenger has fastened a seat belt using vehicle sensor information; and determining, and applying accordingly, full braking, a full braking profile, or an airbag deployment scheme according to the occupancy information of a passenger, the type of the passenger, or whether the passenger has fastened a seat belt, in case of a possibility of a collision, and fully retracting the passenger's seat belt before full braking after partial braking.

After the full braking, at the time of collision with the preceding vehicle, a passenger's behavior, or motion, may be minimized to reduce an injury to the passenger.

The vehicle driving information may include one or more of vehicle sensor information, an image captured by a camera and an electromagnetic wave reflected upon being incident from a radar device.

The step of fully retracting the passenger's seat belt may include: sequentially performing pre-partial braking, the partial braking, and the full braking using an autonomous emergency braking (AEB) system, when it is determined that there is a possibility of a collision.

The AEB system may apply the full braking profile which is a variable step type or a ramp type regarding a deceleration control signal in order to minimize an injury due to an impact at the time of a collision with the preceding vehicle.

The step of fully retracting the passenger's seat belt may include: performing the full retraction by activating a pre-safety seat belt (PSB) system before the full braking, wherein the PSB is activated before a maximum dummy front movement time from the full braking.

The maximum dummy front movement time may be calculated on the basis of $T_{dummy} = T_{delay} + T_{act} + T_{move}$, where $T_{delay}$ is a transmission time of a control signal, $T_{act}$ is a delay time until a passenger's seat belt is fully retracted by a corresponding actuator, and $T_{move}$ is a predetermined dummy time in consideration of a time during which a vehicle is additionally moved after full retraction.

The step of fully retracting the passenger's seat belt may include: deploying an airbag by selectively applying any one of a plurality of airbag deployment schemes associated with air pressure of the airbag using an airbag control unit (ACU) when a speed of a collision with the preceding vehicle is equal to or greater than a reference value.

An operation reference including the occupancy information of the passenger, the type of the passenger, or whether the passenger has fastened a seat belt may be applied with priority to a passenger seat over a driver's seat.

According to exemplary embodiments of the present disclosure, a control device for controlling operations of safety devices of a vehicle includes: a collision possibility determiner for determining whether there is a possibility of a collision with a preceding vehicle on the basis of vehicle driving information; a seat belt fastening determiner for determining occupancy information of a passenger or a type of a passenger or determining whether a passenger has fastened a seat belt using vehicle sensor information; and a controller for determining, and accordingly applying, full braking, a full braking profile, or an airbag deployment scheme according to the occupancy information of a passenger, the type of the passenger, or whether the passenger has fastened a seat belt, in case of a possibility of a collision, and fully retracting the passenger's seat belt before full braking after partial braking.

After the full braking, at the time of collision with the preceding vehicle, a passenger's behavior, or motion, may be minimized to reduce an injury to the passenger.

The vehicle driving information may include one or more of vehicle sensor information, an image captured by a camera and an electromagnetic wave reflected upon being incident from a radar device.

The control device may further include: an autonomous emergency braking (AEB) operator for controlling an AEB system under the control of the controller, wherein the AEB operator may sequentially perform pre-partial braking, the partial braking, and the full braking when it is determined that there is a possibility of a collision.

The AEB operator may apply the full braking profile which is a variable step type or a ramp type regarding, or based on, a deceleration control signal in order to minimize an injury due to an impact at the time of a collision with the preceding vehicle.

The control device may further include: a pre-safety seat belt (PSB) operator for controlling a PSB system under the control of the controller, wherein the PSB operator may calculate a maximum dummy front movement time and activate the PSB system to perform the full retraction before the full braking, wherein the PSB is activated before a maximum dummy front movement time from the full braking.

The maximum dummy front movement time may be calculated on the basis of $T_{dummy}=T_{delay}+T_{act}+T_{move}$, where $T_{delay}$ is a transmission time of a control signal, $T_{act}$ is a delay time until a passenger's seat belt is fully retracted by a corresponding actuator, and $T_{move}$ is a predetermined dummy time in consideration of a time during which a vehicle is additionally moved after full retraction.

The control device may further include: an airbag control unit (ACU) operator for controlling an ACU under the control of the controller, wherein when a speed of a collision with the preceding vehicle is equal to or greater than a reference value, the ACU operator may deploy an airbag by selectively applying any one of a plurality of airbag deployment schemes associated with air pressure of the airbag.

An operation reference including the occupancy information of the passenger, the type of the passenger, or whether the passenger has fastened a seat belt may be applied with priority to a passenger seat over a driver's seat.

BRIEF DESCRIPTION OF THE DRAWINGS

The above and other objects, features and advantages of the present disclosure will be more apparent from the following detailed description taken in conjunction with the accompanying drawings.

FIG. 4 is a table illustrating determinations of whether to perform full braking, a full braking profile and an airbag deployment scheme according to whether seat belts of a driver's seat and a fellow passenger are fastened according to exemplary embodiments of the present disclosure.

DETAILED DESCRIPTION

Figure 1:
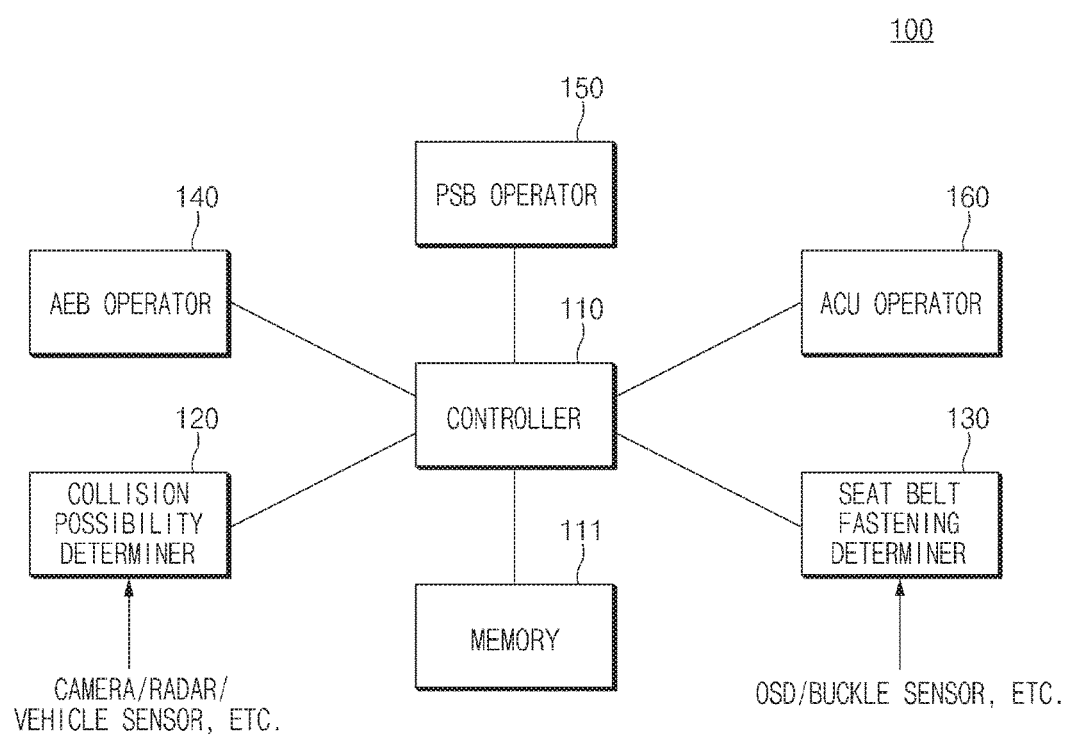
FIG. 1 is a schematic view illustrating a control device for controlling operations of safety devices of a vehicle according to exemplary embodiments of the present disclosure.

Hereinafter, exemplary embodiments of the present disclosure will be described in detail with reference to the accompanying drawings. In each drawing, like reference numerals refer to like elements. Also, the detailed descriptions of the relevant known functions and/or configurations are omitted. In the below-disclosed details, descriptions will focus on elements necessary to understand operations according to various exemplary embodiments, and the detailed descriptions on elements which unnecessarily obscure the important points of the descriptions will be omitted. Also, in the drawings, some elements may be exaggerated, omitted or schematically illustrated. The size of each element does not entirely reflect an actual size, and thus details described herein are not limited by the relative sizes or interval of elements illustrated in each drawing.

FIG. 1 is a schematic view illustrating a control device 100 for controlling operations of safety devices of a vehicle according to exemplary embodiments of the present disclosure.

Referring to FIG. 1, the control device 100 for controlling operations of safety devices of a vehicle according to exemplary embodiments of the present disclosure includes a controller 110 for performing general controlling and a memory 111 for storing information or a setting required for an operation.

The control device 100 further includes a collision possibility determiner (or a collision risk determiner) 120 under the control of the controller 110, a seat belt fastening determiner 130, an autonomous emergency braking (AEB) operator 140 controlling an AEB system for automatic braking, a pre-safety seat belt (PSB) operator 150 controlling a PSB system for enhancing passenger protection performance in the occurrence of a collision by pulling a seat belt immediately before a risky situation such as sudden braking, sliding, and the like, and an airbag control unit (ACU) operator 160 controlling an airbag control unit (ACU) controlling an operation of a driver airbag (DAB), a passenger airbag (PAB) and the like.

The components of the control device 100 for controlling operations of safety devices of a vehicle according to exemplary embodiments of the present disclosure may be implemented by hardware such as a semiconductor processor, software such as an application program or a combination thereof. Also, the controller 110 may be implemented to include one or more functions of the other components of the control device 100 and some functions of the controller 110 may also be implemented as a separate component such as other elements or units.

Hereinafter, an operation of the control device 100 for controlling operations of safety devices of a vehicle according to exemplary embodiments of the present disclosure will be described in more detail with reference to FIG. 2.

Figure 2:
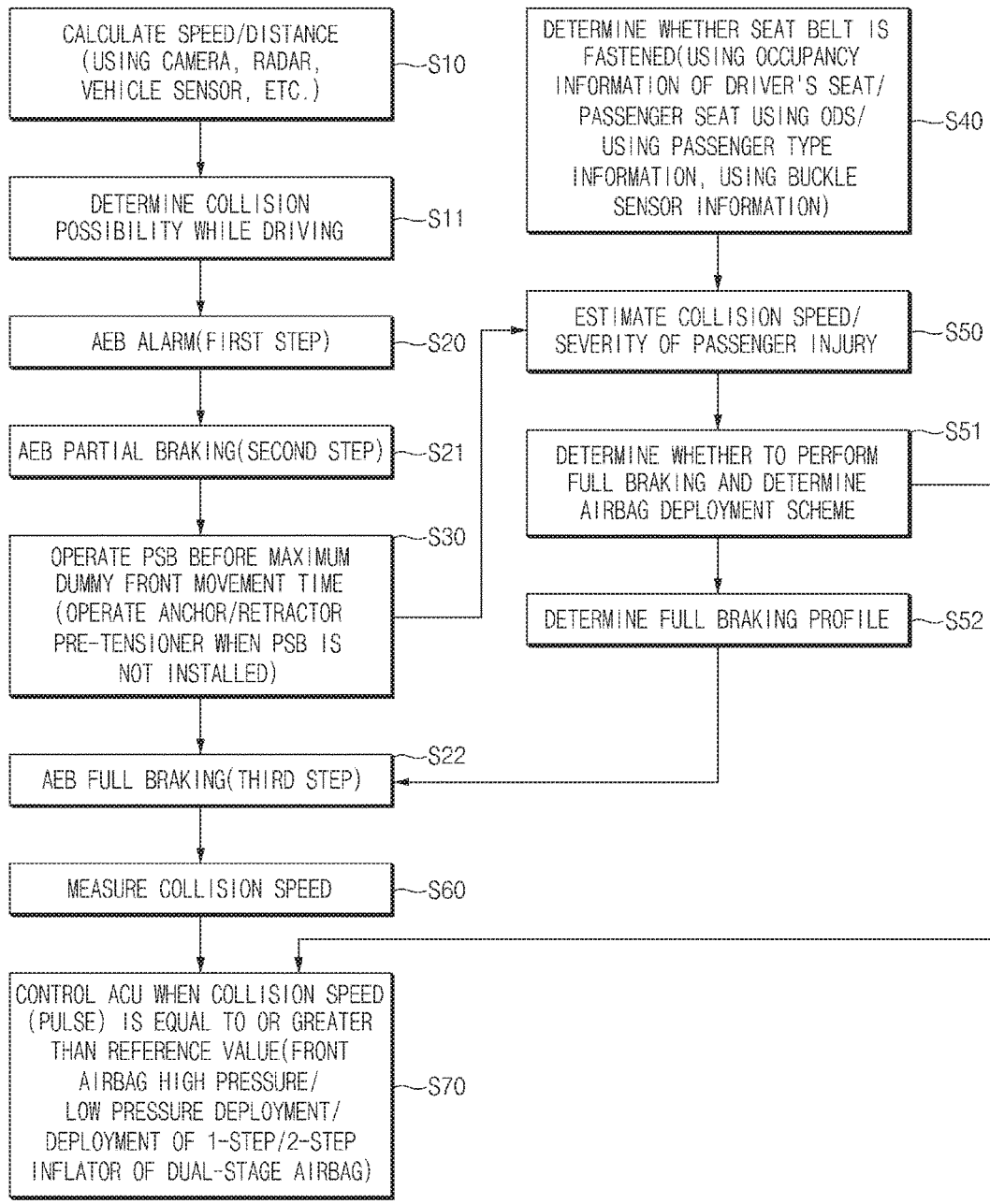
FIG. 2 is a flowchart illustrating an operation of a control device for controlling operations of safety devices of a vehicle according to exemplary embodiments of the present disclosure.

FIG. 2 is a flowchart illustrating an operation of the control device 100 for controlling operations of safety devices of a vehicle according to exemplary embodiments of the present disclosure.

First, under the control of the controller 110 while a vehicle is driving, the collision possibility determiner 120 calculates a speed of a vehicle and a distance to a preceding vehicle using vehicle sensor (an accelerometer, a yaw rate sensor and the like) information and vehicle driving information such as an image captured by a camera, an electromagnetic wave reflected upon being incident from a radar device, and the like in operation S10. The vehicle driving information may be obtained through a separate sensor or device or a vehicle control area network (CAN) bus, and the like.

When the calculated speed of the vehicle and the distance to the preceding vehicle are equal to or greater than a threshold value with reference to a predetermined reference value or value determined from a look-up table (LUT), the collision possibility determiner 120 may determine that there is a possibility of a collision with the preceding vehicle in operation S11.

Figure 3:
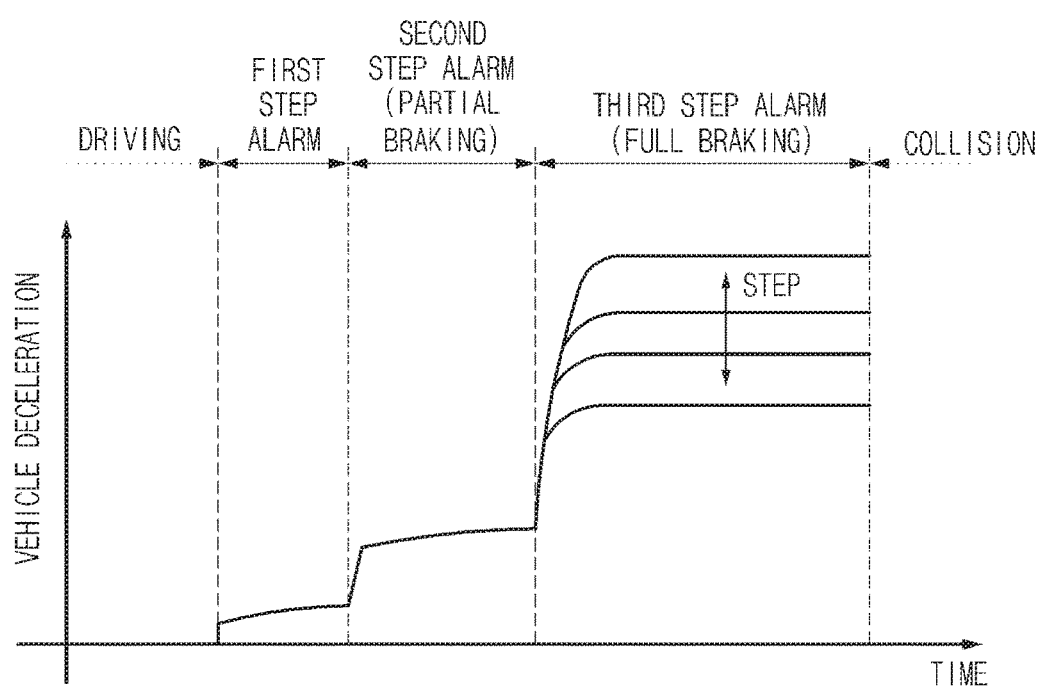
FIG. 3 is a graph illustrating a profile of a vehicle deceleration control signal by stages in each alarm state according to exemplary embodiments of the present disclosure.

When the collision possibility determiner 120 determines that there is a possibility of a collision with the preceding vehicle, the controller 110 controls the AEB operator 140 to activate the AEB system. Here, the AEB operator 140 may start to control an operation of the AEB system such that AEB system enters a first-step alarm state (shown in FIG. 3) in which the AEB system is ready before braking, or the AEB system performs a small braking operation that is difficult to feel in operation S20.

After the first-step alarm state is maintained for a predetermined period of time, the AEB operator 140 may control an operation of the AEB system such that the AEB system enters a second-step alarm state (shown in FIG. 3) in which partial braking corresponding to a predetermined amount and smaller than a full braking amount is generated in operation S21.

In particular, in the present disclosure, during the second-step alarm state, that is, before the AEB system enters the third-step alarm state (shown in FIG. 3), or a full braking state, the controller 110 controls the PSB operator 150 to activate the PSB system (or an anchor or a retractor pretensioner in case of a general seat belt in which a PSB is not installed) to cause the seat belt worn on the driver or the fellow passenger to be retracted in operation S30.

When an operation of the PSB operator 150 is controlled by the controller 110, the PSB operator 150 calculates a maximum dummy front movement time and operates the PSB system to be activated before the AEB system performs full braking. The PSB system is activated before the maximum dummy front movement time from full braking. The maximum dummy front movement time is a time during which the PSB system is to be fully retracted before full braking by the AEB system is anticipated, aiming at minimizing a passenger behavior, or movement, in the event of full braking.

The PSB operator 150 may calculate the maximum dummy front movement time $T_{dummy}$ according to Equation 1.

$$T_{dummy}=T_{delay}+T_{act}+T_{move} \quad \text{[Equation 1]}$$

Here, the maximum dummy front movement time $T_{dummy}$ may be the sum of a transmission time $T_{delay}$ of a control signal for a PSB operation by the controller 110 transmitted through a CAN bus, or the like, a delay time $T_{act}$ during which the PSB system is fully retracted (belt tension is maximized) by a corresponding actuator according to the control signal, and a predetermined dummy time $T_{move}$ in consideration of a time during which the vehicle is additionally moved after belt tension is maximized.

Before a third-step alarm state (shown in FIG. 3) in which full braking is applied by the AEB system is entered in operation S22, the seat belt fastening determiner 130 determines occupancy information of a passenger other than a driver or a type (e.g., weight, adult/child, and the like) of the occupant using passenger information or determines whether the driver or the passenger has fastened their respective seat belt according to information from a seat belt buckle sensor in operation S40. The when occupant detection system (ODS) using a sensor for sensing a passenger is located in each seat, passenger information may include occupancy information of a passenger, type information of an occupant, such as information regarding whether a person is present in the driver's seat, the passenger seat, and the like, is sensed by the ODS, as well as information regarding whether a child is seated (or present) in a child seat. The passenger seat refers to one or more seats beside the driver's seat, and may include one or more seats behind the driver's seat according to circumstances.

Thus, before the maximum dummy front movement time $T_{dummy}$ is calculated by the PSB operator 150 using the speed of the own vehicle and the distance to a preceding vehicle is continuously calculated by the collision possibility determiner 120, the controller 110 may estimate a collision speed at which the vehicle is to collide with the preceding vehicle, a degree of injury to a passenger (e.g., passenger's head, neck etc.), and the like, in operation S50.

Such estimation results may be determined on the basis of the occupancy information of a passenger other than the driver, a type of the occupant, or whether a seat belt is fastened determined by the seat belt fastening determiner 130. The controller 110 may determine whether to apply AEB full braking and various deployment schemes (low air pressure/high air pressure deployment, or deployment of first-step/second-step inflator of a dual-stage airbag) related to air pressure of the airbag (DAB, PAB, etc.) in various manners as illustrated in FIG. 4 in operation S51. When AEB full braking is determined, the controller 110 may also determine an AEB full braking profile (e.g., a step increase/decrease change of a deceleration control signal or a smooth variable increase/decrease change of the deceleration control signal according to a time of a third-step alarm section) in operation S52.

Thereafter, the AEB operator 140 activates the AEB system to enter the third-step alarm state (shown in FIG. 3) of full braking on the basis of a corresponding full braking profile under the control of the controller 110 in operation S22. Thereafter, when the vehicle collides with a preceding vehicle, the controller 110 measures a collision speed (or a pulse size of a collision sensor) based on a vehicle sensor such as an accelerometer, or the like in operation S60. When the collision speed (or the pulse size of the collision sensor) is equal to or greater than a reference value, the controller 110 activates the ACU operator 160 to control an ACU to deploy the airbag (a DAB, a PAB etc.) according to an airbag deployment scheme (low air pressure deployment/high air pressure deployment, deployment of a first-step/second-step inflator of a dual-stage airbag) determined as mentioned above in operation S70.

On the basis of the occupancy information of a passenger other than the driver, a type of the occupant, or whether a seat belt is fastened, the controller 110 may determine whether to apply AEB full braking, various airbag (the DAB, the PAB, etc.) deployment schemes (low air pressure/high air pressure deployment or deployment of a first-step/second-step inflator of a dual-stage airbag), an AEB full braking profile (e.g., step increase/decrease change or smooth variable increase/decrease change in accordance with a time of the third-step alarm section) in various manners as illustrated in FIG. 4.

That is, if the AEB is applied in a state in which a seat belt of a fellow passenger is not fastened, a severity of an injury may increase in the occurrence of collision. Thus, in order to minimize injury to the passenger according to a type thereof, AEB full braking is variably controlled, the AEB system may not be operated (e.g., when 50% or more of passengers at the passenger seat does not fasten the seat belt), and DAB/PAB deployment (high air pressure/low air pressure deployment or deployment of a first-step/second-step inflator of a dual-stage airbag) is variably controlled. Here, however, since the driver grips a steering wheel, severity of an injury due to AEB braking may be less than that of the fellow passenger, and thus, an active and manual safety device operation reference for the passenger seat (occupancy information of a passenger, a type of the passenger, or whether the passenger fastens a seat belt, etc.) may be applied with priority over the driver's seat determinations. For example, when there is a passenger in the passenger seat, a safety device operation determination result based on an operation reference regarding the passenger seat is followed, and otherwise, the safety devices (the AEB system, the PSB system the ACU, etc.) may be controlled according to safety device operation determination results based on the operation reference regarding the driver's seat.

For example, in FIG. 4, when a predetermined proportion (e.g., 50%) or more of passengers in the passenger seats do not fasten their seat belt, AEB full braking may not be applied and the PAB system may control the airbag in a high pressure or low pressure deployment scheme (a vent hole is normally opened). Also, when passengers of less than the predetermined proportion (e.g., 5%) of the passenger seats do not fasten their seat belts, AEB full braking may be applied, the AEB full braking profile may be variably applied, and the PAB system may control the airbag in a low pressure deployment scheme (the vent hole is initially opened). This is merely illustrative and, according to circumstances, when passengers of less than the predetermined proportion (e.g., 5%) in the passenger seats do not fasten their seat belts, AEB full braking may be applied, the AEB full braking profile may be a step type, and the PAB system may control the airbag in the high pressure deployment scheme and open the vent hole normally or in a delay manner. Also, when a child restraint system (CRS) is applied to the child seat, the AEB full braking profile may be applied in a step or variable form and the PAB system may control the airbag according to the high pressure or low pressure deployment scheme (the vent hole is opened initially/normally/in a delayed manner).

In order to minimize an injury due to an impact when the vehicle collides with a preceding vehicle, the AEB full braking profile may be in a form of step increase/decrease change of a deceleration control signal over time (shown in FIG. 3), a smooth variable ramp type increase/decrease change (increase to a highest deceleration or decrease from the highest deceleration at a predetermined rate), and the like. When a collision occurs, a forward movement amount of a passenger's head, neck, and the like, and an acceleration thereof, are reduced through the variable braking controlling based on applications of the AEB full braking profile, and the passenger may be less injured due to an impact in the occurrence of the collision.

Figure 5:
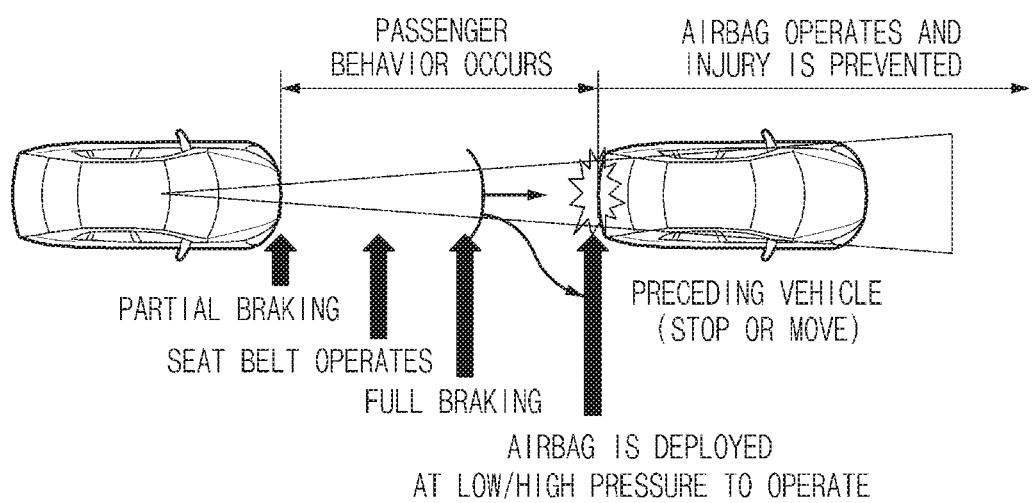
FIG. 5 is a view schematically illustrating sequentially controlling partial braking, seat belt operation, full braking, and airbag deployment when there is a possibility of a collision according to exemplary embodiments of the present disclosure.

As described above, the control device 100 for controlling operations of safety devices of a vehicle according to exemplary embodiments of the present disclosure optimizes operational conditions in order of partial braking, operating a seat belt, full braking (variable application of the profile), and deploying the airbag (variable application of deployment schemes) as illustrated in FIG. 5 by enabling AEB, the airbag (the DAB, the PAB, etc.) the seat belt, the PSB, and the like, to integratedly interwork with the ACU. Further, the airbag may be operated such that an OOP behavior is reduced and an injury to the passenger's head, neck, and other parts is minimized, thus effectively enhancing passenger's safety.

Figure 6:
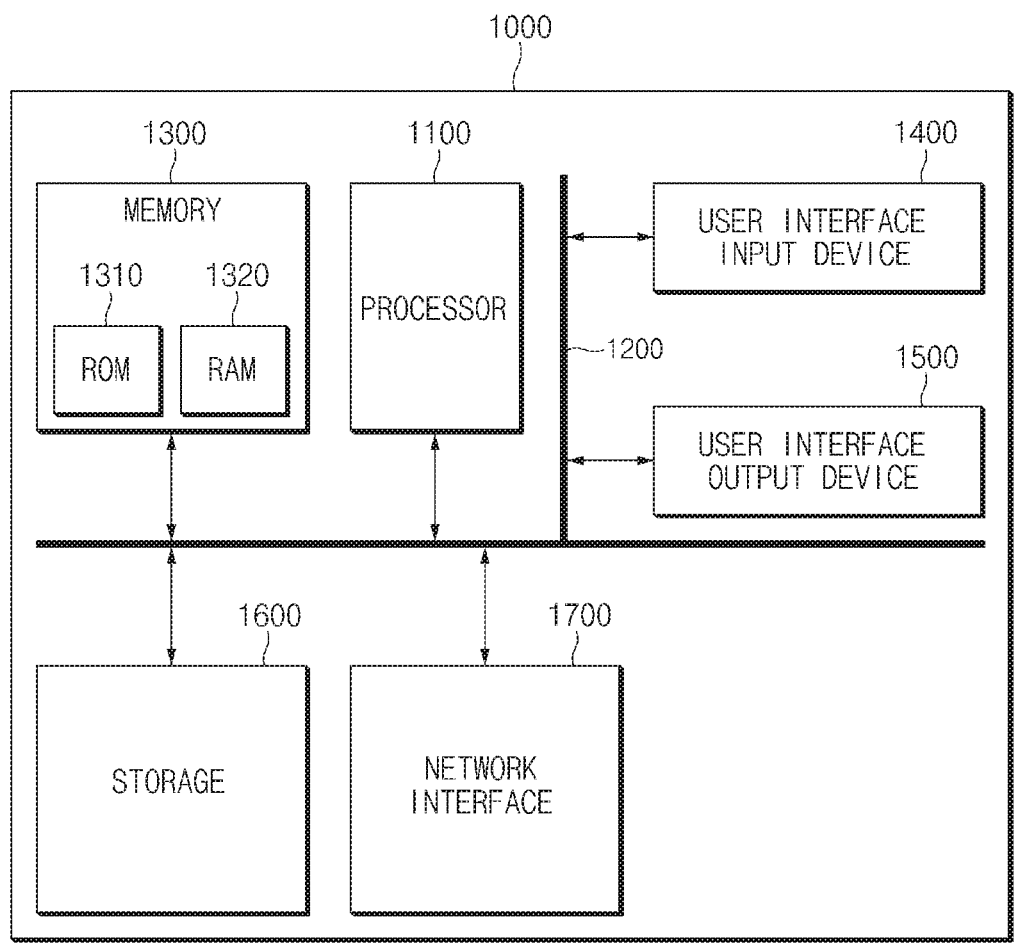
FIG. 6 is a block diagram illustrating an example of a method for implementing a control device for controlling operations of safety devices of a vehicle according to exemplary embodiments of the present disclosure.

FIG. 6 is a block diagram illustrating an example of a method for implementing the control device 100 for controlling operations of vehicle safety devices according to exemplary embodiments of the present disclosure. The control device 100 according to exemplary embodiments of the present disclosure may be configured by hardware, software, or a combination thereof. For example, the control device 100 may be implemented as a computing system 1000 illustrated in FIG. 6.

The computing system 1000 may include at least one processor 1100, a memory 1300, a user interface input device 1400, a user interface output device 1500, a storage 1600 and a network interface 1700 connected through a bus 1200. The processor 1100 may be a semiconductor device executing processing based on command languages stored in a central processing unit (CPU) or the memory 1300 and/or storage 1600. The memory 1300 and the storage 1600 may include various types of volatile or nonvolatile storage mediums. For example, the memory 1300 may include a read only memory (ROM) 1310 and a random access memory (RAM) 1320.

Thus, the steps of the method or algorithm described above in relation to the exemplary embodiments of the present disclosure may be directly implemented by hardware, a software module, or a combination thereof executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a detachable disk or a CD-ROM. An exemplary storage medium is coupled to the processor 1100, and the processor 1100 may read information from the storage medium and write information into the storage medium. In another method or exemplary embodiment, the storage medium may be integrated with the processor 1100. The processor 1100 and the storage medium may reside in an application-specific integrated circuit (ASIC). The ASIC may reside in a user terminal. In another method, the processor 1100 and the storage medium may reside as separate components in a user terminal.

As described, according to the method for operating the safety devices, since the AEB, the airbag (the DAB, the PAB, etc.), the seat belt, the PSB, and the like, are integratedly optimized in operational conditions and operated to interwork with the ACU, the airbag may be operated such that an OOP behavior is reduced and an injury to the passenger's head, neck, and other parts is minimized, thus effectively enhancing passenger's safety.

In addition, by providing an integrated safety technique regarding active and manual safety devices, a brand image may be improved and thus may enhance brand marketability.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling operations of safety devices of a vehicle, the method comprising steps of:
    determining whether there is a possibility of a collision with a preceding vehicle on the basis of vehicle driving information;
    determining occupancy information of a passenger, a type of the passenger, and whether the passenger has fastened a seat belt using vehicle sensor information; and
    determining whether to apply, and applying accordingly, full braking, a full braking profile, or an airbag deployment scheme according to the occupancy information of a passenger, the type of the passenger, and whether the passenger has fastened a seat belt when a possibility of a collision is determined; and
    sequentially performing pre-partial braking, partial braking, and full braking using an autonomous emergency braking (AEB) system, when it is determined that there is a possibility of a collision,
    wherein fully retracting the passenger's seat belt is performed before the full braking is applied after the partial braking is applied.

2. The method according to claim 1, wherein after the full braking application, at the time of a collision with the preceding vehicle, a passenger's motion is minimized to reduce an injury to the passenger.

3. The method according to claim 1, wherein the vehicle driving information includes one or more of vehicle sensor information, an image captured by a camera and an electromagnetic wave reflected upon being incident from a radar device.

4. The method according to claim 1, wherein the AEB system applies the full braking profile which is a variable step or a ramp type based on a deceleration control signal in order to minimize injury due to an impact with the preceding vehicle.

5. The method according to claim 1, wherein the step of fully retracting the passenger's seat belt includes performing the full retraction by activating a pre-safety seat belt (PSB) system before full braking, after a maximum dummy front movement time.

6. The method according to claim 5, wherein the maximum dummy front movement time is calculated on the basis of Tdummy=Tdelay+Tact+Tmove, where Tdelay is a transmission time of a control signal, Tact is a delay time until a passenger's seat belt is fully retracted by a corresponding actuator, and Tmove is a predetermined dummy time in consideration of a time during which a vehicle is additionally moved after full retraction.

7. The method according to claim 1, wherein the step of fully retracting the passenger's seat belt includes deploying an airbag by selectively applying any one of a plurality of airbag deployment schemes associated with air pressure of the airbag using an airbag control unit (ACU) when a speed of a collision with the preceding vehicle is equal to or greater than a reference value.

8. The method according to claim 1, wherein an operation reference including the occupancy information of the passenger, the type of the passenger, or whether the passenger has fastened a seat belt is applied with priority to a passenger seat over a driver's seat.

9. A control device for controlling operations of safety devices of a vehicle, the control device comprising:
    a collision possibility determiner for determining whether there is a possibility of a collision with a preceding vehicle on the basis of vehicle driving information;
    a seat belt fastening determiner for determining occupancy information of a passenger, a type of the passenger, and whether the passenger has fastened a seat belt using vehicle sensor information;
    a controller for determining, and accordingly applying, full braking, a full braking profile, or an airbag deployment scheme according to the occupancy information of a passenger, the type of the passenger, or whether the passenger has fastened a seat belt, in case of a possibility of a collision; and
    an autonomous emergency braking (AEB) operator for controlling an AEB system under the control of the controller,
    wherein the AEB operator sequentially performs pre-partial braking, partial braking, and full braking when it is determined that there is a possibility of a collision,
    wherein the controller fully retracts the passenger's seat belt before the full braking after the partial braking.

10. The control device according to claim 9, wherein, after the full braking, at the time of collision with the preceding vehicle, a passenger's motion is minimized to reduce an injury to the passenger.

11. The control device according to claim 9, wherein the vehicle driving information includes at least one of vehicle sensor information, an image captured by a camera or an electromagnetic wave reflected upon being incident from a radar device.

12. The control device according to claim 9, wherein the AEB operator applies the full braking profile, which is a variable step type or a ramp type, based on a deceleration control signal in order to minimize an injury due to an impact with the preceding vehicle.

13. The control device according to claim 9, further comprising:
    a pre-safety seat belt (PSB) operator for controlling a PSB system under the control of the controller,
    wherein the PSB operator calculates a maximum dummy front movement time and activates the PSB system to perform the full passenger seat belt retraction before the full braking after the corresponding maximum dummy front movement time.

14. The control device according to claim 13, wherein the maximum dummy front movement time is calculated on the basis of Tdummy=Tdelay+Tact+Tmove, where Tdelay is a transmission time of a control signal, Tact is a delay time until a passenger's seat belt is fully retracted by a corresponding actuator, and Tmove is a predetermined dummy time in consideration of a time during which a vehicle is additionally moved after full retraction.

15. The control device according to claim 9, further comprising:
   an airbag control unit (ACU) operator for controlling an ACU under the control of the controller,
   wherein when a speed of a collision with the preceding vehicle is equal to or greater than a reference value, the ACU operator deploys an airbag by selectively applying any one of a plurality of airbag deployment schemes associated with air pressure of the airbag.

16. The control device according to claim 9, wherein an operation reference including the occupancy information of the passenger, the type of the passenger, or whether the passenger has fastened a seat belt is applied with priority to a passenger seat over a driver's seat.

* * * * *